United States Patent
Wang et al.

(10) Patent No.: US 12,123,743 B2
(45) Date of Patent: Oct. 22, 2024

(54) METHODS AND SYSTEMS FOR DETECTING WIND SHEAR CONDITIONS IN AN URBAN AIRSPACE

(71) Applicant: Honeywell International Inc., Charlotte, NC (US)

(72) Inventors: Haifeng Wang, Beijing (CN); Mingquan Liu, Beijing (CN)

(73) Assignee: Honeywell International Inc., Charlotte, NC (US)

( * ) Notice: Subject to any disclaimer, the term of this patent is extended or adjusted under 35 U.S.C. 154(b) by 163 days.

(21) Appl. No.: 17/238,626

(22) Filed: Apr. 23, 2021

(65) Prior Publication Data

US 2022/0341753 A1   Oct. 27, 2022

(51) Int. Cl.
*G01C 23/00*   (2006.01)
*B64D 43/00*   (2006.01)
(Continued)

(52) U.S. Cl.
CPC ........... *G01C 23/005* (2013.01); *B64D 43/00* (2013.01); *G01P 5/00* (2013.01); *G01P 13/0006* (2013.01); *G05D 1/1062* (2019.05)

(58) Field of Classification Search
None
See application file for complete search history.

(56) References Cited

U.S. PATENT DOCUMENTS 9,527,605 B1   12/2016   Gentry et al.
10,223,924 B2   3/2019   Wang et al.
(Continued)

FOREIGN PATENT DOCUMENTS

CN   107539483 A   1/2018
JP   2009192262 A   *   8/2009   .............. G01W 1/10
(Continued)

OTHER PUBLICATIONS

"Wind shear: an invisible enemy to pilots?" by Jean Daney, Safety First vol. 19, Product Safety Department, Jan. 2015., (Year: 2015).*
(Continued)

*Primary Examiner* — Adam D Tissot
*Assistant Examiner* — Charles Pall
(74) *Attorney, Agent, or Firm* — Alston & Bird LLP (57) ABSTRACT

Disclosed are methods, systems, and non-transitory computer-readable media for detecting wind shear conditions in an urban airspace. For instance, the method may include obtaining aircraft information related to an aircraft in the urban airspace, accessing three-dimensional building information corresponding to the airspace, obtaining wind speed and direction data from a plurality of sensors provided about the airspace, and detecting wind shear conditions in at least a portion of the airspace based on the obtained wind speed and direction data. The method may further include determining real-time flight safety parameters in the portion of the airspace based on the wind shear conditions detected in at least the portion of the airspace, analyzing the determined real-time flight safety parameters along a designated flight path through the portion of the airspace to determine whether an unsafe flight condition exists, and transmitting the analysis to the aircraft or a remote operating station.

18 Claims, 4 Drawing Sheets

(51) Int. Cl.
  *G01P 5/00*   (2006.01)
  *G01P 13/00*  (2006.01)
  *G05D 1/00*   (2024.01)

(56) References Cited

U.S. PATENT DOCUMENTS

| | | | |
|---|---|---|---|
| 10,698,422 B2 | 6/2020 | Tuukkanen et al. | |
| 2016/0111007 A1* | 4/2016 | Dennerline | G08G 5/0013 |
| | | | 701/528 |
| 2018/0009016 A1 | 3/2018 | Nishi et al. | |
| 2019/0138825 A1* | 5/2019 | Lee | G06V 20/584 |
| 2019/0147753 A1* | 5/2019 | Hendrian | G05D 1/104 |
| | | | 701/14 |
| 2019/0271563 A1 | 9/2019 | Pandit et al. | |
| 2020/0023461 A1 | 7/2020 | Inanov et al. | |
| 2020/0233439 A1 | 7/2020 | Ivanov et al. | |
| 2020/0278695 A1 | 9/2020 | Tuukkanen et al. | |
| 2020/0333307 A1* | 10/2020 | Armitage | G08B 21/16 |

FOREIGN PATENT DOCUMENTS

| | | | |
|---|---|---|---|
| JP | 2013054005 A | * | 3/2013 |
| TW | 201537206 A | * | 10/2015 |

OTHER PUBLICATIONS

Thielicke, MD, William, "Optokopter—Precise Airflow Measurements", *Optolution Messtechnik GmbH, Laser Optical Flow Measurement*, Germany.

Wang, Bohang, et al., "Controller For UAV To Oppose Different Kinds Of Wind In The Environment", *Journal Of Control Science And Engineering*, vol. 2020, Article ID 5708970, https://doi.org/10.1155/2020/5708970.

Wang, Bo Hang et al., "An Overview Of Various Kinds Of Wind Effects On Unmanned Aerial Vehicle", *Themed Paper, Measurement And Control*, 1-9, 2019.

Ware, John, et al., "An Analysis Of Wind Field Estimation And Exploitation For Quadrotor Flight In The Urban Canopy Layer".

Notification of Oral Proceeding Mailed on May 29, 2024 for EP Application No. 21210613, 9 page(s).

* cited by examiner

METHODS AND SYSTEMS FOR DETECTING WIND SHEAR CONDITIONS IN AN URBAN AIRSPACE

TECHNICAL FIELD

Various embodiments of the present disclosure relate generally to the field of navigation for urban air mobility vehicles and, more particularly, to methods and systems for detecting wind shear conditions in an urban airspace.

BACKGROUND

Wind shear, also referred to as wind gradient, is a variation in wind speed or direction over a relatively short distance in the atmosphere. Commonly appearing near microbursts and downbursts caused by thunderstorms, fronts, areas of locally higher low-level winds referred to as low-level jets, mountains, buildings, and wind turbines, wind shear has significant effects on the control of an aircraft, and has been a sole or contributing cause of many aircraft accidents. Low-level wind shear can affect aircraft airspeed during takeoff and landing in serious ways. As the aircraft crosses into the region of the downdraft, the localized headwind diminishes, reducing the aircraft's airspeed and increasing its sink rate. Then, when the aircraft passes through the other side of the downdraft, the headwind becomes a tailwind, reducing lift generated by the wings, and putting the aircraft into a low-power, low-speed descent.

Wind shear detecting systems are often built around airports to detect wind shear, particularly due to the aforementioned increased risk associated with takeoff and landing in wind shear conditions. However, the urban airspace environments, in which aircraft such as urban air mobility (UAM) vehicles operate, remain unequipped for wind shear detection. At the altitudes at which these vehicles operate, skyscrapers and other structures are capable of disturbing airflow and triggering wind shear conditions. As such, wind shear can be a challenge to safely navigating and operating UAM vehicles in an urban airspace.

The present disclosure is directed to overcoming one or more of these above-referenced challenges.

SUMMARY OF THE DISCLOSURE

According to certain aspects of the disclosure, methods and systems are disclosed for detecting wind shear conditions in an urban airspace.

For instance, a method for detecting wind shear conditions in an urban airspace can include obtaining aircraft information related to an aircraft in the urban airspace, accessing three-dimensional building information corresponding to the urban airspace, obtaining wind speed and direction data from a plurality of wind speed and direction sensors provided about the urban airspace, and detecting wind shear conditions in at least a portion of the urban airspace based on the obtained wind speed and direction data. The method may further include determining real-time flight safety parameters in the portion of the urban airspace based on the wind shear conditions detected in at least the portion of the urban airspace, analyzing the determined real-time flight safety parameters along a designated flight path through the portion of the urban airspace to determine whether an unsafe flight condition exists, and transmitting the analysis to the aircraft or a remote operating station indicating whether the unsafe flight condition exists.

Moreover, a system may include a plurality of wind speed and direction sensors provided about an urban airspace, one or more operator displays, a memory storing instructions, and a processor executing the instructions to perform a process for detecting wind shear conditions in the urban airspace. The process performed can include obtaining aircraft information related to an aircraft present in the urban airspace, accessing three-dimensional building information corresponding to the urban airspace, obtaining wind speed and direction data from the plurality of wind speed and direction sensors, and detecting wind shear conditions in at least a portion of the urban airspace based on the obtained wind speed and direction data. The process may further include determining real-time flight safety parameters in the portion of the urban airspace based on the wind shear conditions detected in at least the portion of the urban airspace, analyzing the determined real-time flight safety parameters along a designated flight path through the portion of the urban airspace to determine whether an unsafe flight condition exists, and transmitting the analysis to the aircraft or a remote operating station by displaying the wind shear conditions to one or more aircraft operators via the one or more operator displays.

Moreover, a system may include a plurality of wind speed and direction sensors provided about an urban airspace, each of the plurality of wind speed and direction sensors including a wireless transmitter, an aircraft control unit in control of an aircraft having a designated flight path, one or more operator displays, a memory storing instructions, and a processor executing the instructions to perform a process for detecting wind shear conditions in the urban airspace. The process performed can include obtaining aircraft information related to the aircraft present in the urban airspace, accessing three-dimensional building information corresponding to the urban airspace, obtaining wind speed and direction data from the plurality of wind speed and direction sensors, and detecting wind shear conditions in at least a portion of the urban airspace based on the obtained wind speed and direction data. The process may further include determining real-time flight safety parameters in the portion of the urban airspace based on the wind shear conditions detected in at least the portion of the urban airspace, analyzing the determined real-time flight safety parameters along the designated flight path through the portion of the urban airspace to determine whether an unsafe flight condition exists, transmitting the analysis to the aircraft by displaying the wind shear conditions to one or more aircraft operators via the one or more operator displays, calculating a flight path modification in response to determining an unsafe flight condition exists, and adjusting the designated flight path in accordance with the flight path modification.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to the field of navigation for urban air mobility vehicles and, more particularly, to methods and systems for detecting and alerting the presence of wind shear conditions in an urban airspace.

In general, the present disclosure is directed to methods and systems that address one or more of the above challenges by detecting and alerting the presence of wind shear conditions in an urban airspace to alert aircraft operators of potentially serious wind shear conditions and assist them in safely navigating the urban airspace. For instance, a system may provide the aircraft with an indication of the presence and location of a wind shear condition. The systems and/or methods of the present disclosure for detecting wind shear conditions in an urban airspace may reduce the burden on the vehicle operator by providing advance notice of a wind shear condition to the operator and/or by calculating a modification to the aircraft's flight path to avoid or safely traverse the wind shear condition. By monitoring the urban airspace and identifying areas of wind shear concern, aircraft operators may exhibit an increased awareness of a potential risk. Further, by assisting the operators in navigating those areas of wind shear concern, aircraft may be more safely and efficiently routed around, or supported as they pass through, wind shear in the urban environment.

While this disclosure describes the methods and systems with reference to aircraft, it should be appreciated that the present methods and systems may be applicable to various other vehicles impacted by wind shear, including those of drones, helicopters, or any other manned, unmanned, autonomous, and/or internet-connected vehicles.

Figure 1:
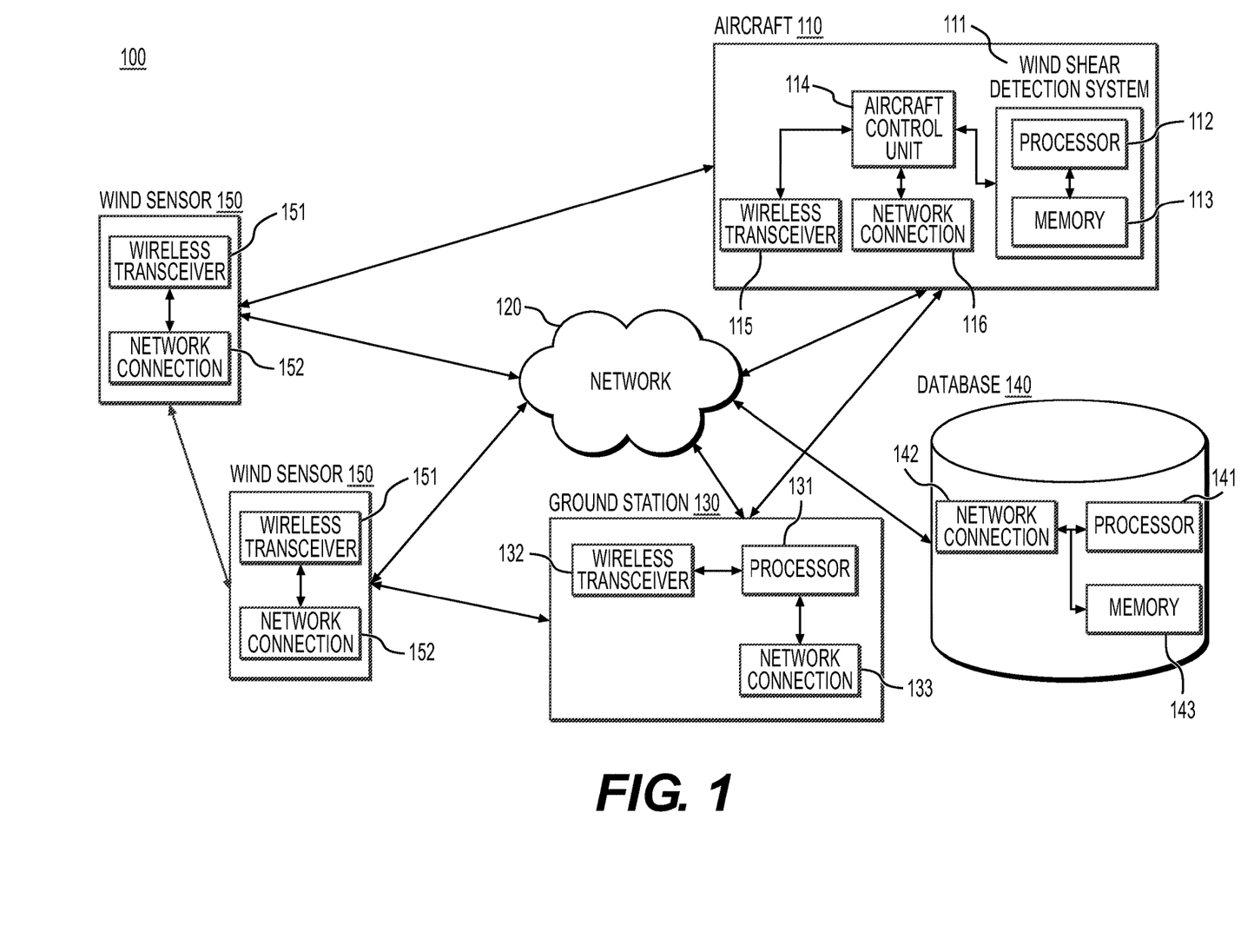
FIG. 1 depicts an exemplary system environment in which methods, systems, and other aspects of the present disclosure may be implemented.

FIG. 1 depicts an example of a system environment 100 in which systems, methods, and other aspects of the present disclosure may be implemented. The system environment 100 of FIG. 1 may include an aircraft 110, a network 120, one or more ground stations 130, a database 140, and a plurality of wind sensors 150. Aircraft 110 can be equipped with a wind shear detection system 111, which may include a processor 112 and a memory 113. Wind shear detection system 111 may be in communication with an aircraft control unit 114 of aircraft 110.

Aircraft control unit 114 may be configured to control and monitor various aspects of the aircraft's flight, including, for example, the flight path of aircraft 110 and the flight sensors on the aircraft (e.g., GPS, altimeters, airspeed indicators, vertical speed indicators, compasses, artificial horizons, attitude indicators, fuel/battery level sensors). Aircraft 110 can also be equipped with one or more modes of communicating, such as a wireless transceiver 115 (i.e., a device capable of functioning as a transmitter and/or a receiver) and/or a network connection 116. For example, wireless transceiver 115 and/or network connection 116 may allow aircraft 110 to communicate with other elements in system environment (e.g., network 120, ground stations 130, database 140, wind sensors 150) via radio frequency (RF), cellular, and/or satellite communications.

Network 120 may be implemented as, for example, the internet, a wireless network, a wired network (e.g., Ethernet), a local area network (LAN), a Wide Area Network (WANs), Bluetooth, Near Field Communication (NFC), or any other type of network including a combination of such networks that provides communication capabilities between one or more components of the system environment 100. In some embodiments, the network 120 may be implemented using a suitable communication protocol or combination of protocols such as an internet connection in combination with a cellular or satellite data network.

Aircraft 110 may communicate with one or more ground stations 130 via network 120 and/or direct RF communication in order to obtain information regarding, for example, air traffic control, building information for buildings in the urban airspace, wind speed and direction data, and weather reports. Each ground station 130 may include a processor 131 provided with a wireless transceiver 132 and a network connection 133 to allow ground station 130 to communicate with other elements in system environment 100. In some embodiments, wireless transceiver 132 can allow ground station 130 to communicate with aircraft 110 and or wind sensors 150. Network connection 133 may be provided in addition to or in lieu of wireless transceiver 132 to allow ground station 130 to communicate with other elements in system environment 100 via network 120.

Network 120 can allow aircraft 110 and ground stations 130 to access database 140, in order to obtain certain types of information, for example, navigation data, building information, flight plans, and locations of wind sensors 150. Database 140 may also include historical wind shear data or other weather information relevant to the flight of aircraft 110. To receive, store, and/or transmit data, database 140 may include processor 141, network connection 142, and memory 143. For example, processor 141 may respond to inquiries from other system components received via network connection 142 by accessing memory 143 and transmitting responsive messages via network connection 142 and network 120. In some embodiments, database 140 may be integrated into one or more other components of system environment 100, such as ground station 130; however, database 140 may also be implemented as a cloud-based system accessible remotely via network 120.

Because wind shear is the presence of a wind gradient over a relatively short distance, a plurality of wind sensors 150 may be positioned throughout the urban airspace to allow the wind shear detection system 111 to evaluate how the wind speed and direction are changing through the airspace. Each of the wind sensors 150 can be configured to measure the wind speed and direction at a particular point in the urban airspace, and those measurements can then be transmitted, via wireless transceiver 151 and/or network connection 152 and network 120 to aircraft 110 and/or ground station 130. As discussed below, wind sensors 150 are likely placed above the ground in the airspace, and as a result, it may not be convenient to have some or all of the wind sensors connected to, for example, a traditional wired network. In some embodiments, wind sensors 150 may be networked to one another, and/or to wireless networks inside of the buildings or structures on which they are positioned.

Figure 2:
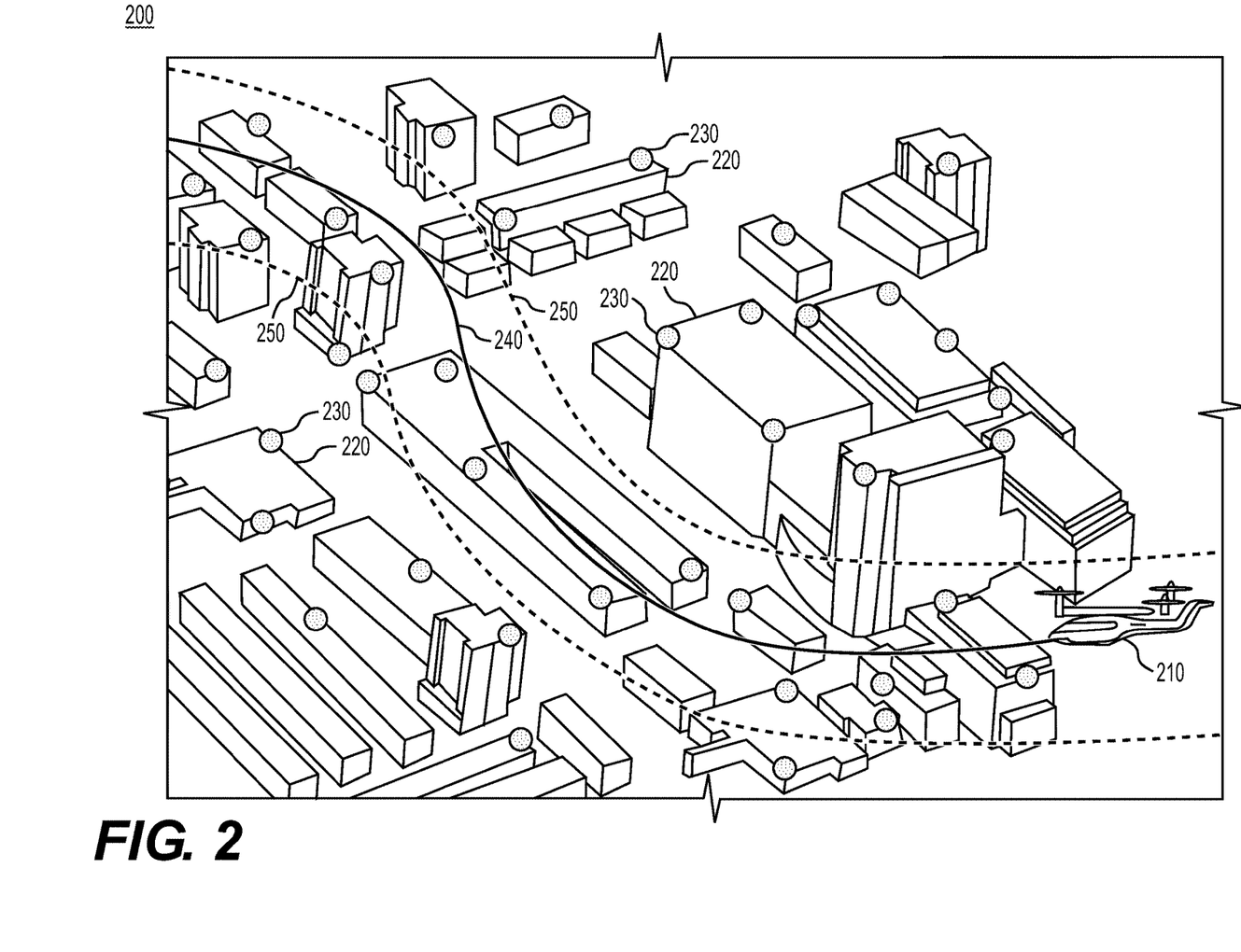
FIG. 2 depicts an exemplary urban airspace in which methods, systems, and other aspects of the present disclosure may be implemented.

An exemplary urban airspace 200 is illustrated in FIG. 2, in accordance with the present disclosure. Aircraft 210 may traverse urban airspace 200 by flying above, in between, and/or adjacent to the buildings/structures 220 dispersed throughout airspace 200. A plurality of wind sensors 230 may be attached to at least some of the building/structures in order to elevate the wind sensors 230 off of the ground and provide accurate, local wind speed and direction data at various points in airspace 200.

As aircraft 210 traverses urban airspace 200, it may do so along a flight path 240. In order to monitor and identify the presence of wind shear conditions that would potentially have an adverse effect on aircraft 210, wind shear detection system 111 may query multiple wind sensors 230. In particular, the wind sensors 230 that are within a certain distance from flight path 240 may be the most relevant to wind shear detection system 111. In some embodiments, this may be represented by a flight path wind corridor 250 that wind shear detection system 111 may define in order to determine which wind sensors 230 should be included in the wind shear analysis.

As illustrated in FIG. 2, some wind sensors 230 are located inside of flight path wind corridor 250, while others are located outside of flight path wind corridor. Defining a flight path wind corridor 250 may reduce the amount of wind speed and direction data that an individual wind shear detection system 111 would need to obtain and analyze. In some embodiments, flight path wind corridor 250 may be of a different shape or may be defined based on one or more factors including, for example, the distance between a wind sensor 230 and aircraft's flight path 240, the distance between a wind sensor 230 and the aircraft 210, the distance between the wind sensors 230, the magnitude and/or direction of the wind in airspace 200, and the type of aircraft 210.

Figure 3:
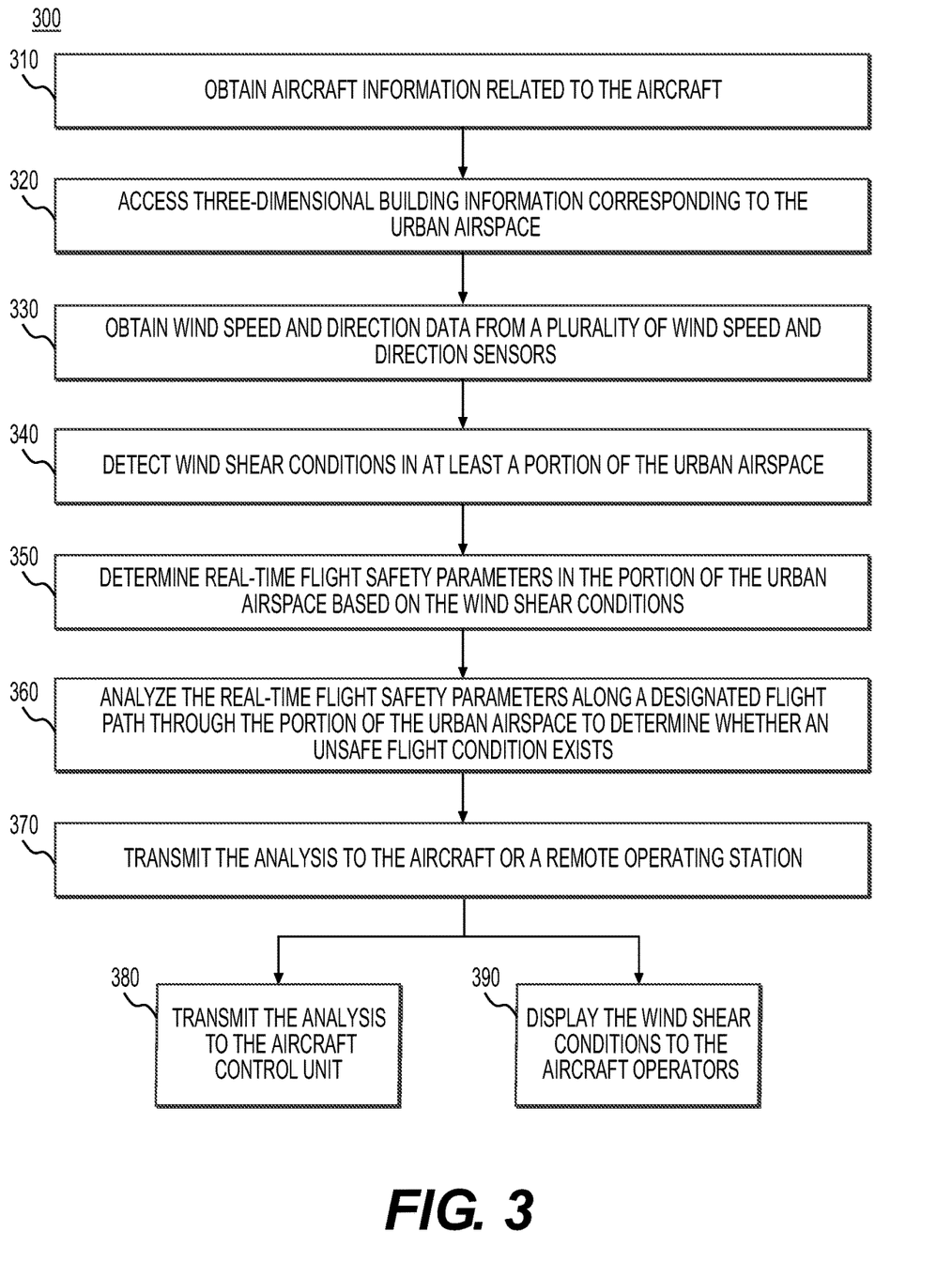
FIG. 3 depicts a flowchart for an exemplary process for detecting wind shear conditions in an urban airspace, according to one or more embodiments.

FIG. 3 illustrates an exemplary method 300 for detecting wind shear conditions in an urban airspace in accordance with embodiments of the present disclosure. It should be understood that the steps described herein, and the sequence in which they are presented, are merely illustrative such that additional and/or fewer steps may be included without departing from the scope of the present disclosure.

Beginning at step 310, wind shear detection system 111 may be configured to obtain aircraft information from, for example, aircraft control unit 114. This can be accomplished via a connection, directly and/or via network 120, between wind shear detection system 111 and aircraft control unit 114. The aircraft information may include the position of the aircraft, the speed of the aircraft, and the type of aircraft. The type of aircraft may relate to evaluating predetermined safety factors and/or a predetermined flight safety threshold. This may be because the size, shape, weight, propulsion system, and/or the presence of other safety features can relate to how significant of a wind shear condition a particular aircraft can safely navigate.

Once the aircraft information is obtained, at step 320, the system may then access three-dimensional building information corresponding to the urban airspace. This information may enable wind shear detection system 111 to model airspace 200 and/or provide a visual representation of airspace 200 to operators of the aircraft.

At step 330, wind shear detection system 111 may obtain wind speed and direction data from one or more wind sensors 230. Wind speed and direction data can be obtained in a number of different manners. For example, in some embodiments, the wind sensors 230 each provide wind shear detection system 111 with wind speed and direction data pertaining to a single position, and then wind shear detection system 111 may then aggregate the data from the individual sensors. Individual wind sensors 230 may connect directly to the aircraft via RF transmission and/or via network 120. Wind shear detection system 111 may select a particular sensor or group of sensors to connect to, or it may connect to any sensor that is located in a particular range.

Wind speed and direction data from wind sensors 230 may also be collected by a central server or database, such as database 140 or ground station 130, so that the aircraft is able to receive data that has been pre-aggregated. In some embodiments, the aggregated data is transmitted to the aircraft via network 120. Wind sensors 230 may also transmit their wind speed and direction data amongst one another, creating an internet of things (IoT) network or a similar arrangement, whereby the aircraft may connect to a single wind sensor 230, and obtain wind speed and direction data from a plurality of sensors from that single sensor.

Figure 4:
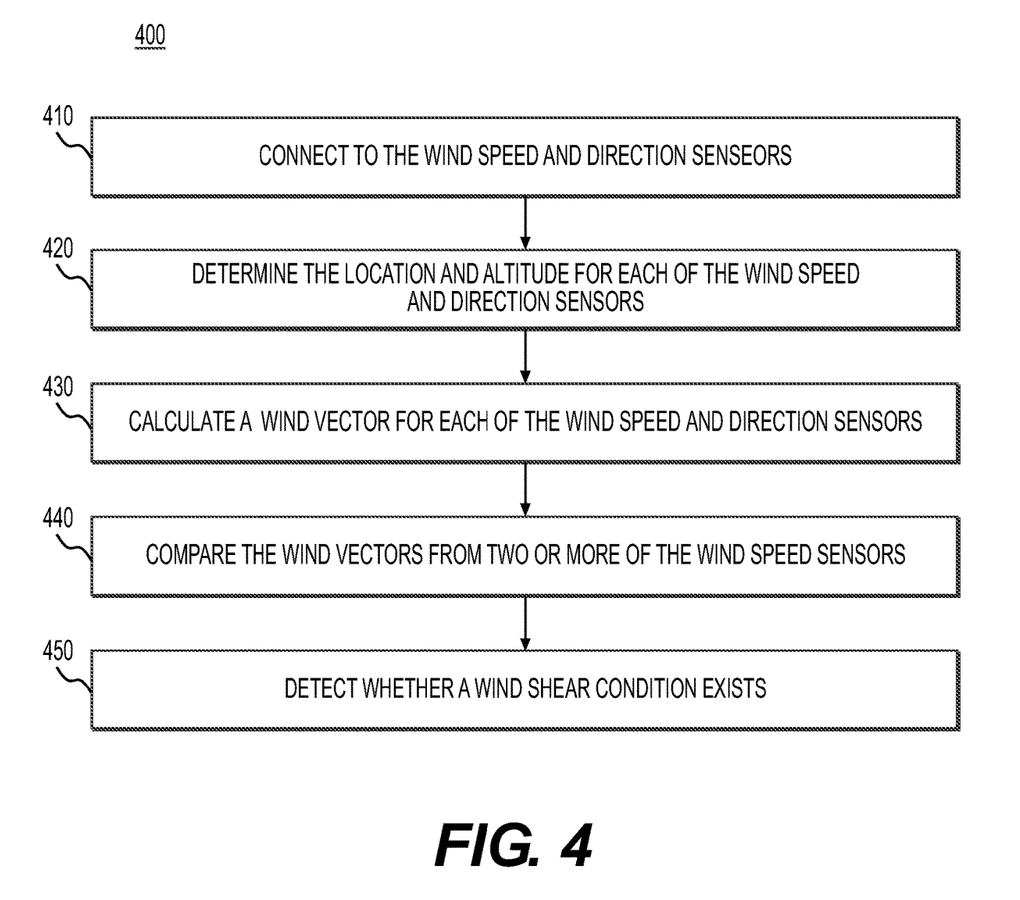
FIG. 4 depicts a flowchart for an exemplary process for detecting the presence of a wind shear condition, according to one or more embodiments.

Once wind shear detection system 111 has accessed three-dimensional building information corresponding to the airspace and obtained wind speed and direction data, at step 340, it may then determine wind shear conditions in at least a portion of the airspace by a suitable analysis. An exemplary method 400 for detecting the presence of a wind shear condition is depicted in FIG. 4.

The system may begin, at step 410, by connecting to the wind speed and direction sensors. As discussed above, this can be accomplished by a direct connection to each wind sensor, by connecting to a ground station or database that is in communication with the wind sensors, by connecting to a wind sensor that is itself networked to other wind sensors, or a combination of these methods. At step 420, wind shear detection system 111 may determining the location and altitude for each of the plurality of wind speed and direction sensors from which data has been received, and, at step 430, the system may calculate a wind vector for each of those wind sensors, and correlate the wind vectors with the physical locations and altitudes within the airspace.

Next, because wind shear is a variation in wind speed and/or direction over a distance, at step 440, the wind vectors from two or more of the wind sensors may be compared. In response to these comparisons indicating a substantial variation in wind speed and/or direction, wind shear detection system 111 may, at step 450, detect that a wind shear condition exists. The system may apply analysis techniques to use the collected data to identify the presence of wind shear conditions.

Returning to FIG. 3, due to the possibility that the presence of wind shear may not inherently rise to the level of requiring further analysis, at step 350, wind shear detection system 111 may analyze the wind shear conditions in at least a portion of the airspace and determine real-time flight safety parameters. This analysis may include, for example, evaluating a magnitude of the wind shear conditions in comparison to a predetermined flight safety threshold. The result may be, for example, a determination that under the particular wind shear conditions, an aircraft may need to be of a certain type, size, weight, or be traveling at a particular speed or altitude to safely navigate the portion or the airspace that includes the wind shear condition. These real-time flight safety parameters may provide guidance with respect to the navigability of the specific wind shear condition determined to be present.

In response to the real-time safety parameters, at step 360, wind shear detection system 111 may analyze the determined real-time flight safety parameters as they relate to a designated flight path through the portion of the urban airspace to determine whether an unsafe flight condition exists for the aircraft. This analysis may be based on predetermined safety factors specific to characteristics of the aircraft, such as the type, size, weight, and/or battery/fuel level of the aircraft as it proceeds along its designated flight path. The analysis may result in the identification of locations of unsafe flight conditions that may exist along the designated flight path, and may also result in an assessment of the severity and/or risk associated with those areas of unsafe wind shear conditions.

Once the airspace has been analyzed for the presence of wind shear and the safety of the aircraft's flight through the urban airspace, at step 370, wind shear detection system 111 can provide the analysis to the aircraft as an indication of whether the unsafe flight condition exists, where it is located, and how severe it may be. In some embodiments, the wind shear analysis and conditions may be displayed to the aircraft operators via one or more operator displays (step 390), including those in use for other aircraft functions such as navigation.

In response to determining the unsafe flight condition exists, wind shear detection system 111 may, automatically or in response to an operator request, calculate a flight path modification to avoid wind shear conditions. Wind shear detection system 111 may display the flight path modification to the one or more aircraft operators, and allow the operator to decide whether or not to take the adjusted path, or in some embodiments and/or some circumstances of severe wind shear, the designated flight path may be automatically modified.

While the wind shear analysis may be displayed to the operators, at step 380, wind shear detection system 111 may also interface directly with aircraft control unit 114 to provide warnings and additional guidance directly to the aircraft. Aircraft control unit 114 may be configured to respond automatically to the presence of wind shear conditions, such as by compensating appropriately in the control system or autonomously rerouting the aircraft. Such direct integrations may be configured to operate in connection with autopilot systems, fly-by-wire controls, and/or other advanced aircraft systems to avoid or safely navigate areas of wind shear concern.

Methods and systems for detecting wind shear conditions in an urban airspace in accordance with the present disclosure may be able to provide an aircraft and/or the operator(s) of that aircraft with information regarding the existence and severity of wind shear conditions along a proposed flight path. This information may enable the aircraft to more safely navigate an urban airspace. Because an encounter with unanticipated wind shear may result in damage to (including the potential loss of) an aircraft, an aircraft that is capable of monitoring the airspace for the existence of such conditions may be able to traverse the airspace more safely, and may be able to operate at a lower altitude or in certain spaces near large buildings that could be treacherous to aircraft without such information. As urban airspaces become increasingly used for the operation of aircraft, such as UAMs, the ability to operate more safely in a greater portion of that airspace may support additional air traffic and/or reduce the amount of leeway a vehicle may require.

The general discussion of this disclosure provides a brief, general description of a suitable computing environment in which the present disclosure may be implemented. In one embodiment, any of the disclosed systems and/or methods may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the embodiments disclosed herein. It is intended that the specification and examples be considered as exemplary only, with a true scope and spirit of the present disclosure being indicated by the following claims.

What is claimed is:

1. A method for detecting wind shear conditions in an airspace comprising at least one structure, the method comprising:

obtaining aircraft information related to an aircraft present in the airspace, wherein the aircraft information comprises an aircraft type corresponding to the aircraft;

accessing three-dimensional building information corresponding to the airspace;

obtaining wind speed and direction data from at least a portion of a plurality of wind speed and direction sensors provided on the at least one structure of the airspace;

determining a sensor location and a sensor altitude for each of the plurality of wind speed and direction sensors provided on the at least one structure of at least a portion of the airspace that includes a designated flight path of the aircraft;

identifying a first subset of wind speed and direction sensors of the plurality of wind speed and direction sensors as being located within a flight path wind corridor, wherein each of the first subset of wind speed and direction sensors identified as being located within the flight path wind corridor are determined to be within the flight path wind corridor based at least in part on a respective distance between each of the first subset of wind speed and direction sensors and the flight path being determined to be below a threshold distance;

calculating a wind vector for each of the first subset of wind speed and direction sensors provided on the at least one structure of the portion of the airspace;

comparing the wind vectors from two or more of the first subset of wind speed and direction sensors provided on the at least one structure of the portion of the airspace to detect a variation in wind speed and/or direction between the two or more wind speed and direction sensors of the first subset;

upon determining that a variation in wind speed and/or direction exists between the two or more wind speed and direction sensors of the first subset, determining that a wind shear condition exists in at least the portion of the airspace defining the flight path wind corridor;

upon determining that a wind shear condition exists in the flight path wind corridor within the airspace, determining real-time flight safety parameters in the flight path wind corridor based on (i) the wind shear condition detected in the flight path wind corridor and (ii) the aircraft type corresponding to the aircraft;

analyzing the determined real-time flight safety parameters along the designated flight path through the flight path wind corridor to determine whether an unsafe flight condition exists; and transmitting the analysis to the aircraft or a remote operating station indicating whether the unsafe flight condition exists.

2. The method of claim 1, wherein each of the plurality of wind speed and direction sensors include a wireless transmitter.

3. The method of claim 2, wherein obtaining wind speed and direction data includes receiving, via an aircraft transceiver, wind speed and direction data transmitted from the wireless transmitter included with each of the plurality of wind speed and direction sensors.

4. The method of claim 2, wherein obtaining wind speed and direction data includes receiving, via an aircraft transceiver, wind speed and direction data transmitted from a ground station in communication with the wireless transmitter included with each of the plurality of wind speed and direction sensors.

5. The method of claim 1, wherein analyzing the flight path wind corridor to determine real-time flight safety parameters includes evaluating a magnitude of the wind shear conditions in comparison to a predetermined flight safety threshold.

6. The method of claim 1, wherein the analysis of the real-time flight safety parameters along the designated flight path is based at least in part on predetermined safety factors related to the aircraft.

7. The method of claim 1, wherein transmitting the analysis to the aircraft or the remote operating station includes displaying the wind shear conditions to one or more aircraft operators.

8. The method of claim 7, further comprising:
calculating a flight path modification in response to determining the unsafe flight condition exists; and
displaying the flight path modification to the one or more aircraft operators.

9. The method of claim 1, further comprising:
calculating a flight path modification in response to determining the unsafe flight condition exists; and
adjusting the designated flight path in accordance with the flight path modification.

10. A system comprising:
a plurality of wind speed and direction sensors provided about an airspace comprising at least one structure;
one or more operator displays;
a memory storing instructions; and a processor executing the instructions to perform a process for detecting wind shear conditions in the airspace including:

obtaining aircraft information related to an aircraft present in the airspace, wherein the aircraft information comprising an aircraft type corresponding to the aircraft;

accessing three-dimensional building information corresponding to the airspace;

obtaining wind speed and direction data from at least a portion of a plurality of wind speed and direction sensors provided on buildings and/or structures of the airspace;

determining a sensor location and a sensor altitude for each of the plurality of wind speed and direction sensors provided on the at least one structure of at least a portion of the airspace that includes a designated flight path of the aircraft;

identifying a first subset of wind speed and direction sensors of the plurality of wind speed and direction sensors as being located within a flight path wind corridor, wherein each of the first subset of wind speed and direction sensors identified as being located within the flight path wind corridor are determined to be within the flight path wind corridor based at least in part on a respective distance between each of the first subset of wind speed and direction sensors and the flight path being determined to be below a threshold distance;

calculating a wind vector for each of the first subset of wind speed and direction sensors provided on the at least one structure of the portion of the airspace;

comparing the wind vectors from two or more of the first subset of wind speed and direction sensors provided on the at least one structure of the portion of the airspace to detect a variation in wind speed and/or direction between the two or more wind speed and direction sensors of the first subset;

upon determining that a variation in wind speed and/or direction exists between the two or more wind speed and direction sensors of the first subset, determining that a wind shear condition exists in at least the portion of the airspace defining the flight path wind corridor;

upon determining that a wind shear condition exists in the flight path wind corridor within the airspace, determining real-time flight safety parameters in the flight path wind corridor based on (i) the wind shear condition detected in the flight path wind corridor and (ii) the aircraft type corresponding to the aircraft;

analyzing the determined real-time flight safety parameters along the designated flight path through the flight path wind corridor to determine whether an unsafe flight condition exists; and transmitting the analysis to the aircraft or a remote operating station by displaying the wind shear conditions to one or more aircraft operators via the one or more operator displays.

11. The system of claim 10, wherein the analysis of the real-time flight safety parameters along the designated flight path is based at least in part on predetermined safety factors related to the aircraft.

12. The system of claim 10, the process further comprising:

calculating a flight path modification in response to determining the unsafe flight condition exists; and displaying the flight path modification to the one or more aircraft operators.

13. The system of claim 10, the process further comprising:

calculating a flight path modification in response to determining the unsafe flight condition exists; and adjusting the designated flight path in accordance with the flight path modification.

14. A system comprising:

a plurality of wind speed and direction sensors provided about an airspace comprising at least one structure, each of the plurality of wind speed and direction sensors including a wireless transmitter;

an aircraft control unit in control of an aircraft having a designated flight path;

one or more operator displays;

a memory storing instructions; and a processor executing the instructions to perform a process for detecting wind shear conditions in the airspace including:

obtaining aircraft information related to the aircraft present in the airspace;

accessing three-dimensional building information corresponding to the airspace;

obtaining wind speed and direction data from a plurality of wind speed and direction sensors provided on the at least one structure of the airspace, wherein the aircraft information comprises an aircraft type corresponding to the aircraft;

determining a sensor location and a sensor altitude for each of the plurality of wind speed and direction sensors provided on the at least one structure of at least a portion of the airspace that includes a designated flight path of the aircraft;

identifying a first subset of wind speed and direction sensors of the plurality of wind speed and direction sensors as being located within a flight path wind corridor, wherein each of the first subset of wind speed and direction sensors identified as being located within the flight path wind corridor are determined to be within the flight path wind corridor based at least in part on a respective distance between each of the first subset of wind speed and direction sensors and the flight path being determined to be below a threshold distance;

calculating a wind vector for each of the first subset of wind speed and direction sensors provided on the at least one structure of the portion of the airspace;

comparing the wind vectors from two or more of the first subset of wind speed and direction sensors provided on the at least one structure of the portion of the airspace to detect a variation in wind speed and/or direction between the two or more wind speed and direction sensors of the first subset;

upon determining that a variation in wind speed and/or direction exists between the two or more wind speed and direction sensors of the first subset, determining that a wind shear condition exists in at least the portion of the airspace defining the flight path wind corridor;

upon determining that a wind shear condition exists in the flight path wind corridor within the airspace, determining real-time flight safety parameters in the flight path wind corridor based on (i) the wind shear condition detected in the flight path wind corridor and (ii) the aircraft type corresponding to the aircraft;

analyzing the determined real-time flight safety parameters along the designated flight path through the flight path wind corridor to determine whether an unsafe flight condition exists;

calculating a flight path modification in response to determining an unsafe flight condition exists; and adjusting the designated flight path in accordance with the flight path modification.

15. The method of claim 1, further comprising:

defining the flight path wind corridor based at least in part on:
- a separation distance between the wind and direction sensors, an initial magnitude and direction of a detected wind in the airspace, and the aircraft type; and identifying the first subset of wind speed and direction sensors of the plurality of wind speed and direction sensors by determining that the first subset of wind speed and direction sensors are within the flight path wind corridor.

16. The method of claim 1, further comprising:

establishing a respective connection with each of the first subset of wind and direction sensors.

17. The method of claim 1, wherein obtaining the wind speed and direction data from the plurality of wind speed and direction sensors comprises:

connecting a single sensor from the first subset of wind speed and direction sensors, wherein the single sensor provides the wind speed and direction data collected from each sensor of the first subset of wind speed and direction sensors.

18. The method of claim 1, further comprising:

causing depiction, via a user interface, of an unsafe zone in the airspace based at least in part on the unsafe flight condition.

* * * * *